Oct. 26, 1926.
M. O. HOOVER
BULL ROPE TRIP
Filed Feb. 24, 1926
1,604,514
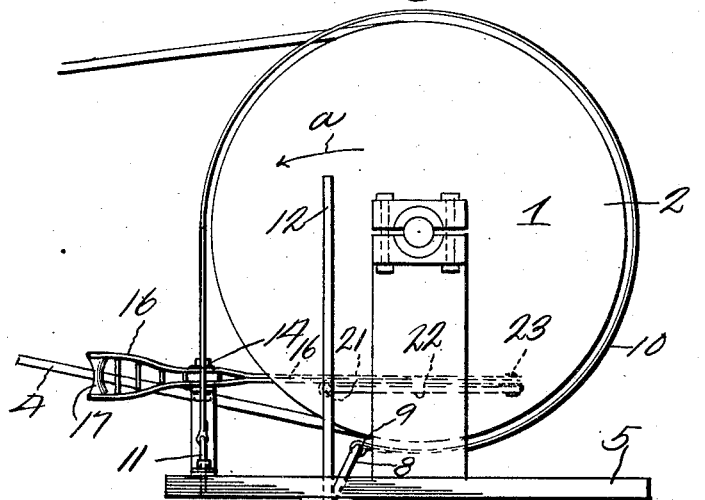
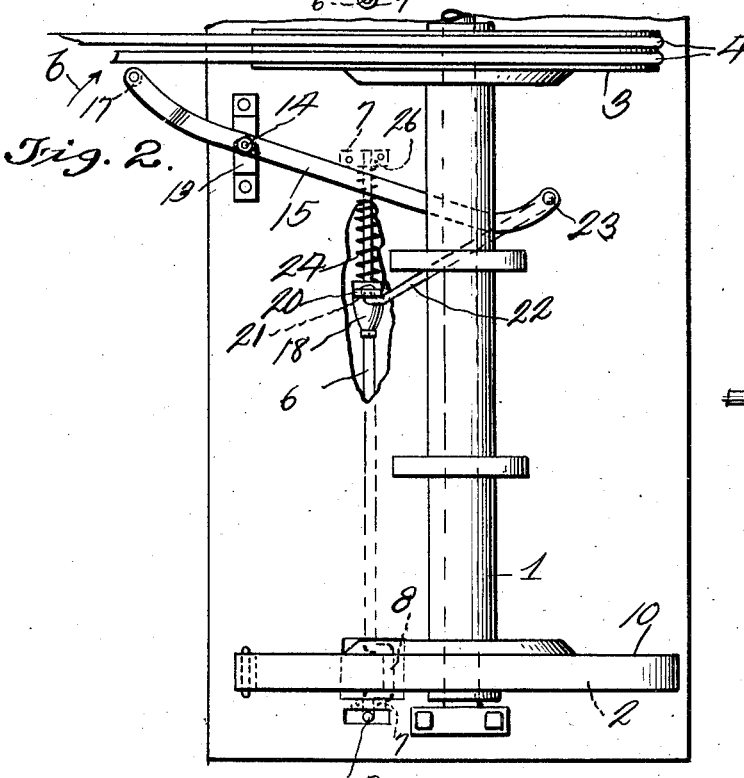
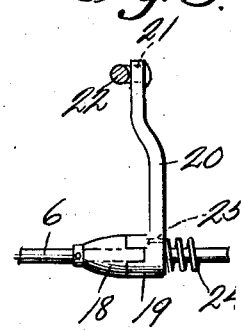
Inventor
M. O. Hoover
By Philip A. H. Ferell
Attorney Patented Oct. 26, 1926.

1,604,514

UNITED STATES PATENT OFFICE.

MERLE O. HOOVER, OF SHOSHONI, WYOMING.

BULL-ROPE TRIP.

Application filed February 24, 1926. Serial No. 90,314.

The invention relates to cable shifting devices, and has for its object to provide a device of this character particularly adapted for use automatically in connection with a brake band operating mechanism of a bull wheel of an oil drilling rig, whereby when the brake is set on the wheel, the cables will be automatically thrown or forced off of the cable drum, thereby obviating the present dangerous practice of throwing off the cables by hand.

A further object is to provide a transversely disposed rock shaft below the drum, which rock shaft is provided with a crank cooperating with a brake band, a horizontally disposed pivoted shifting lever, an upwardly extending arm carried by the shaft and a link connection between the upwardly extending arm and the horizontally disposed shifting lever, whereby upon rocking of the transversely disposed shaft upon contracting the brake band, the shift lever will be moved outwardly into engagement with the cables extending around a grooved pulley and will force said cables off said pulley.

A further object is to provide the transversely disposed shaft with a clutch member adjustable on the shaft and the upwardly extending arm with a clutch member cooperating with the first mentioned clutch member whereby the position of the upwardly extending arm may be varied for adjusting the brake band and spring means carried by the transversely disposed shaft for causing the brake band to be expanded when the control lever is released.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of a conventional form of drilling rig drum, showing the device applied thereto.

Figure 2 is a top plan view of the drum and cable shifting device.

Figure 3 is a detail elevation of the upwardly extending arm of the clutch member.

Referring to the drawing, the numeral 1 designates the bull wheel which is supported in the usual manner and which bull wheel is provided at one side thereof with a brake drum 2 and at the other side thereof with a grooved pulley 3. Extending over the pulley 3 are cables 4 which extend forwardly in the usual manner for operating mechanism of an oil drill rig, and which cables, it is necessary from time to time, to throw off of the pulley 3. The present practice is to throw the cables 4 off by hand, however this is an extremely dangerous operation, and to obviate this danger the present device is primarily designed. Extending transversely beneath the platform 5 is a rock shaft 6, which rock shaft is rockably mounted in brackets 7 adjacent opposite sides of the platform. Rock shaft 6 beneath the platform 5 is provided with an upwardly extending crank 8, to which is connected at 9 one end of the contractible brake band 10, and which brake band extends upwardly over the brake drum 2 and is anchored at 11 to the platform. Shaft 6 is provided with an upwardly extending lever 12 and it will be seen when the operator grasps the lever 12 and moves the same in the direction of the arrow $a$, the brake band 12 will be contracted into engagement with the outer periphery of the brake drum 2.

Extending upwardly from the platform 5 adjacent the grooved pulley 3 is a bracket 13, on which is pivotally mounted at 14 a horizontally disposed lever 15. One end of the lever is provided with a bifurcation 16 in which is rotatably mounted a roller 17, and which roller is in the path of the lower sides of the cables 4 and it will be seen when the outer end of the lever is forced in the direction of the arrow $b$, the roller 17 will engage the cables 4 and force the same from the grooved pulley 3, and which operation is automatic and simultaneous with the braking operation through mechanism hereinafter set forth. Secured to the transversely disposed shaft 6 is a clutch member 18 with which a clutch member 19 carried by an upwardly extending arm 20 cooperates and by providing said clutch member adjustment of the arm 20 may be easily made during the adjustment of the brake band. Pivotally connected at 21 to the upper end of the arm 20 is a link 22, which link is in turn pivotally connected at 23 to the inner end of the shifting lever 15, therefore it will be seen when the operating lever 12 is moved in the direction of the arrow $a$, and the shaft 6 rocked, the arm 20 will impart a pull on the link 22 and rock the shifting lever 15 on its pivotal point 14 and force the roller 17 against the cables 4 and throw the same off the grooved pulley 3. Surrounding the shaft 6 is a coiled spring 24, one end of which is anchored at 25 to the clutch member 19 and the other end at 26 to the bracket 7, therefore it will be seen that said coiled spring will be tensioned upon a rocking of the shaft 6 in the direction of the arrow $a$ and when the lever 12 is released the spring 24 will rotate the shaft 6 in a reverse direction and move the parts to inoperative positions and the brake band 10 out of engagement with the periphery of the brake drum 2.

From the above it will be seen that a bull rope shifting device is provided in connection with a drum of an oil drilling rig, which will automatically shift the cables from the grooved pulley when the brake is set, the device is simple in construction and positive in its operation.

The invention having been set forth what is claimed as new and useful is:—

1. The combination with an oil drill rig drum having a brake drum at one end thereof, a contractible brake band extending over said drum, a grooved pulley at the other end of said drum, cables extending over the grooved pulley, of a transversely disposed rock shaft, a crank carried by said rock shaft and connected to the brake band, a horizontally disposed pivoted lever adjacent the grooved pulley, a cable engaging member carried by said pivoted levers, an upwardly extending arm carried by the rock shaft and a link connection between the upwardly extending arm and the pivoted lever whereby upon rocking the rock shaft and contracting the brake band the pivoted lever will be rocked into engagement with the cable and force the same off the grooved pulley.

2. The combination with a rotatable drum having a brake drum at one end and a grooved pulley at the other end over which cables extend, a brake band extending over said brake drum, of means for simultaneously contracting the brake drum and forcing the cables off the grooved pulley, said means comprising a transversely disposed rock shaft, an operating lever carried by the rock shaft, a crank carried by the rock shaft and connected to the brake band, an upwardly extending arm carried by the rock shaft, a horizontally disposed pivoted lever above the rock shaft and adjacent the grooved pulley, said pivoted lever having a cable engaging roller, and a link connection between the upwardly extending arm and the pivoted lever whereby upon rocking of the rock shaft the roller will be forced into engagement with the cables and the cables forced off the grooved pulley, and a coiled return spring surrounding the transversely disposed shaft and having one of its ends anchored at a fixed point, the other end of said spring being anchored to the upwardly extending arm.

In testimony whereof I hereunto affix my signature.

MERLE O. HOOVER.